June 18, 1968     L. E. LESSTER     3,389,304
EXCESSIVE CURRENT PROTECTION DEVICE FOR
HIGH-FREQUENCY, SQUARE-WAVE POWER
SUPPLY FOR DISCHARGE DEVICES Filed Sept. 10, 1965     2 Sheets-Sheet 1

WITNESSES:
Paul Hentzel
Bernard R. Gregory

INVENTOR
Laban E. Lesster
BY W. D. Palmer
ATTORNEY

United States Patent Office  3,389,304
Patented June 18, 1968

3,389,304
EXCESSIVE CURRENT PROTECTION DEVICE FOR HIGH-FREQUENCY, SQUARE-WAVE POWER SUPPLY FOR DISCHARGE DEVICES
Laban E. Lesster, Pittsburgh, Pa., assignor to Westinghouse Electric Corporation, Pittsburgh, Pa., a corporation of Pennsylvania
Filed Sept. 10, 1965, Ser. No. 486,285
2 Claims. (Cl. 317—23)

ABSTRACT OF THE DISCLOSURE

Excessive current protection device for high-frequency, square-wave power supply for discharge devices wherein a current switching means is periodically switched with respect to its impedance states by a trigger means to provide the periodic output current to the load. The load capacitor in series with the discharge device has developed thereacross a saw-tooth voltage. A feedback circuit is coupled by a coupling device to the voltage developed across the load, and a rectifier converts into DC the periodic output developed across the load device. The resulting DC charges a feedback capacitor which is designed to discharge at the predetermined rate. A feedback switching means is responsive to the voltage developed across the feedback capacitor and controls the trigger means to rapidly interrupt the flow of current to the load if an excessive load current is sensed.

---

This invention relates generally to power supply circuits and more particularly to such circuits which are provided with protection against excessive load currents.

Heretofore short circuit and overload protection devices have operated by sensing an excessive current or some condition produced thereby. In relay type devices the excessive current trips a current responsive switch. In fuse type devices the excessive current generates heat which melts the conducting wire inside the fuse. Both of these prior art devices generally require a substantial time to react between the initial short circuit or overload and the interruption of the input supply current. It is desirable to interrupt the input current flow immediately to minimize the damage incurred by the excessive current. This is especially true when employing thermally sensitive devices such as thyristors and other solid state circuit elements. The excessive current flowing during the device reaction-time could damage the semiconductor interior. In addition, the fuses in the fuse type must be replaced which is an added expense, and time consuming. The relay type must be mechanically reset and is subject to mechanical wear and arcing.

Generally, prior art devices cut off the supply current at a given critical value. This critical level remains constant even though the load impedance and load current may vary. Ideally the critical current value should be slightly greater than the normal load current required by the variable load. Further, the critical current value should automatically increase as the load current is increased through varying the load.

It is therefore an object of this invention to provide a power supply circuit with improved protection for the circuit elements therein against excessive current caused by short circuits or low impedances in the load.

It is another object of this invention to provide a power supply circuit having short circuit protection which is almost instantaneously responsive to the short circuit condition.

It is an additional object of this invention to provide the above short circuit protection which automatically resets into normal operation when the short circuit condition is removed.

It is still a further object of this invention to provide the above short circuit protection which is responsive to a critical current value which increases automatically as the normal load current increases.

Further objects and advantages of the invention will become apparent and features of novelty which characterize the invention will be pointed out in particularity in the following detailed description.

For a better understanding of the invention reference may be had to the accompanying drawings wherein.

Briefly these and other objects are achieved by providing variable duty cycle input switching elements which control the magnitude of the AC input current to the power supply. This variable magnitude input current is rectified and filtered into variable magnitude DC. The DC is inverted into a periodic output current of a controlled frequency by output switching elements which are regularly and alternately switched On and Off. A variable frequency oscillator provides periodic pulses which turn On the output switching elements and initiate the start of each half cycle of the periodic output current. A reactance in the load stores energy at the start of each half output cycle and releases the energy at the end of each half cycle. The output switching elements are switched Off by the energy released from the load reactance each half cycle. The energy required to switch Off the output switching elements is proportional to the current flowing therethrough to the load. If a short circuit or low resistance is inadvertently placed across the output of the power supply, in parallel with the load, the load current increases and the energy released each half cycle by the load reactance is no longer sufficient to switch Off the output switching elements. The output switching elements stop switching and the periodic characteristic of the output current is lost. In order to detect the absence of the periodic output signal, a feedback circuit is provided which is responsive to a periodic voltage developed from the periodic output current across an impedance device. The feedback circuit controls the duty cycle of the input switching elements and prevents the flow of input current by establishing a high-impedance state in the input switching devices. When a short circuit occurs the output switching elements fail to switch, and the feedback circuit detects the absence of the periodic voltage and prevents the input switching elements from conducting current into the power supply circuit. The entire feedback process takes less than one third of an input cycle in time. The load is increased by adding individual load units in parallel. Each unit contains sufficient reactance to keep the output switching elements switching in spite of the increased current therethrough due to that unit. The critical current value of the power supply automatically increases as the normal load current increases because of the added load reactances. A resetting circuit is provided which can automatically or manually restart the power supply circuit into operation when the cause of the short circuit has been removed.

Figure 1:
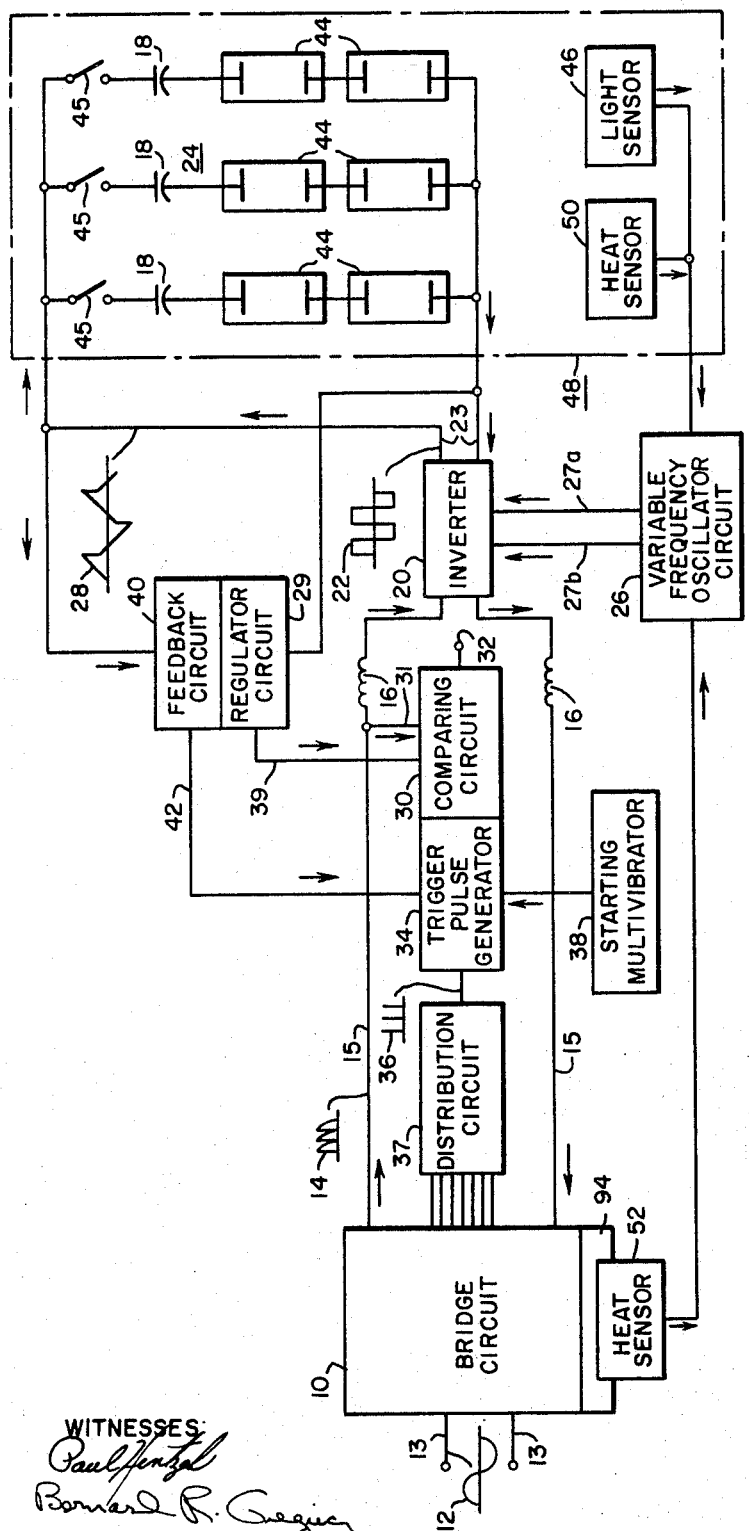
FIG. 1 shows a complete lighting system using the present invention.

Referring specifically to the figures, FIG. 1 shows a block diagram of a high-frequency lighting system which incorporates the invention. The waveforms appearing in the system are conveniently located on the diagram and identified with reference numerals. The flow of current and/or information is indicated by arrows adjacent to the circuit conductors. A conventional variable duty cycle rectifying input bridge circuit 10 is shown which converts the single phase or three phase AC 12 at input 13 into phase controlled pulsating DC 14. The bridge 10 preferably provides full wave rectification, however, a half wave rectifying bridge may be employed. The input switching elements employed in the bridge 10 are preferably thyristors (SCR's) because of the heavy currents that must be conducted and switched; however, other switching devices may be employed. The pulsating DC 14 is applied to the bridge output conductors 15 and is filtered by inductors 16 which are serially connected in conductors 15. An inverter 20 inverts the filtered DC into a high frequency, preferably square wave output current 22 which is applied across a lamp load 24 through inverter output conductors 23. The capacitive nature of the load 24 causes the square wave current 22 to appear as a sawtooth type voltage 28 across the load 24. The load capacitors 18 charge each half cycle to a peak voltage determined by a regulator circuit 29 which is connected across the inverter output conductors 23. The frequency inverter 20 and the square wave current 22 is controlled by a variable frequency oscillator 26 which is connected to the inverter 20. The frequency may be varied, for example, from 1 kc. to 4 kc. to establish the desired range of output current magnitude and lamp intensity.

In order to trigger the bridge 10 and vary the duty cycle thereof, the pulsating DC 14 therefrom is applied to a comparing circuit 30, which is connected to the bridge output lead 15 through a comparing circuit input lead 31. The comparing circuit 30 compares a voltage developed by the pulsating DC 14 to a reference potential 32. Each cycle, the developed voltage becomes equal to, and passes through, the value of the reference potential 32, and causes a trigger pulse generator 34 to provide a trigger pulse. This sequence of trigger pulses 36 which is synchronized with the input AC is applied to all of the input switching elements of the bridge 10 simultaneously through a distribution circuit 37. The power level of the DC 14 is adjusted by controlling the phase-displacement between the trigger pulses 36 and the input AC 12 by means of the comparing circuit 30 and trigger pulse generator 34. The usual method is to vary the value of the reference potential 32. The phase-displacement is ultimately controlled by the regulator circuit 29 through feedback path 39. The phase-displacement varies the duty cycle or conduction angle of the bridge 10 input switching elements. For a more detailed explanation of the triggering mechanism for the bridge 10 reference should be had to a copending application Ser. No. 486,283, filed concurrently herewith by L. E. Lesster and B. R. Pelly, entitled "An Improved Firing Circuit."

A starting multivibrator 38 is provided for initially starting the bridge 10. The multivibrator 38 is connected to the trigger pulse generator 34 and initiates the trigger pulse output. The normal trigger pulses 36 cannot be obtained until the bridge 10 has an output which affects the comparing circuit 30 and activates the trigger pulse generator 34.

A feedback circuit 40 is provided across the inverter 20, in parallel with the load 24 to protect the system against excessive currents due to short circuits across the load. The feedback circuit 40 is responsive to the periodic characteristic of sawtooth type voltage 28 which is developed across the load 24 by square wave current 22. The feedback circuit 40 can eliminate the trigger pulse output 36 of pulse generator 34 through feedback path 42. In the event of a short circuit in the load 24, the feedback device 40 will not receive the periodic voltage and will prevent the bridge 10 from conducting current to the load 24 by removing the trigger pulses 36.

The light intensity of the fluorescent lamps 44 depends on the current level therethrough and is controlled by varying the frequency of the oscillator 26 which controls the frequency of the square wave current 22 as described in copending application Ser. No. 403,814, filed Oct. 14, 1965, by A. H. B. Walker, now abandoned, and assigned to the present assignee. The oscillator 26 is connected to the inverter 20 through oscillator output conductors 27a and 27b. A light sensor 46, connected to the variable frequency oscillator 26, is disposed in the region 48 which is illuminated by the lamps 44. The light sensor 46 detects changes in the ambient light level of the region 48 and adjusts the frequency of the oscillator 26 to increase or decrease the lamp current and change the light intensity of the lamps 44 accordingly. Similarly, a region heat sensor 50 is connected to the oscillator 26 and is disposed in the illuminated region 48. The heat sensor 50 regulates the temperature of the illuminated region 48. The sensors may be set for a desired light level or temperature by the people in the region 48. An additional heat sensor 52 is provided disposed in heat transfer relation with the input switching elements in the bridge 10. This bridge sensor 52 detects the operating temperature of the switching elements and prevents them from overheating. For a more detailed description of the sensors and their operation, reference should be had to copending application Ser. No. 486,284 filed concurrently herewith, by L. E. Lesster and J. W. Wigert, entitled "Light, Heat and Temperature Control System," and assigned to the present assignee.

Figure 2:
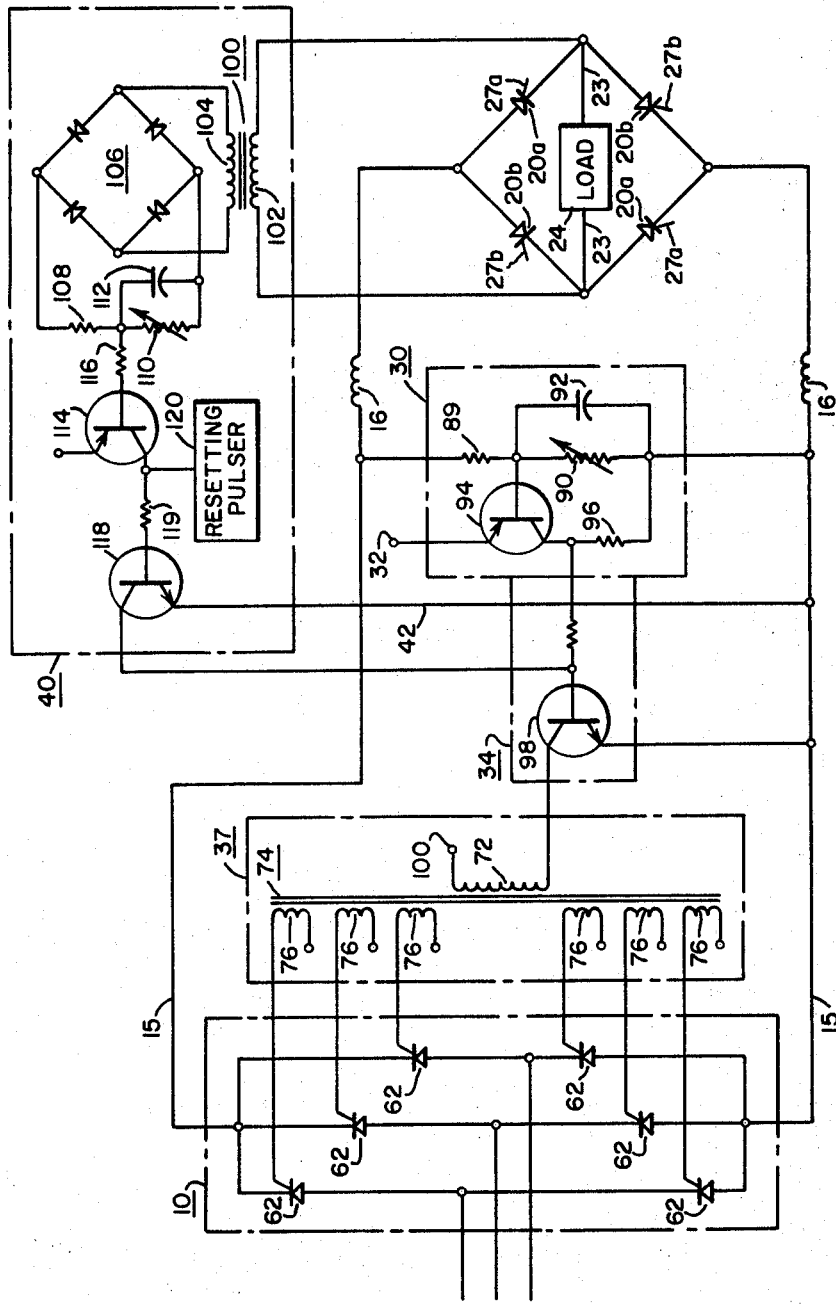
FIG. 2 shows a detailed schematic diagram of the feedback, comparing trigger, distribution, and input bridge circuits of the lighting system of FIG. 1.

FIG. 2 shows a detailed schematic diagram of the excessive current protection portions of the lighting system shown in FIG. 1. The bridge 10 is shown having six input switching thyristors (SCR's) 62 arranged in the conventional fashion for full wave rectifying the three phase input 12 into the pulsating DC 14. A single phase input could be used equally well with an appropriate single phase bridge. The bridge 10 is triggered by pulses derived from its own pulsating DC 14 output. The pulsating DC 14 is applied across a voltage dividing network in comparing circuit 30 which has a fixed resistor 89 for dropping the voltage of the pulsating DC 14 and a variable resistor 90 connected in series therewith. A capacitor 92 is connected in parallel with the variable resistor 90 which charges due to the pulsating DC 14 through fixed resistor 89. The capacitor 92 discharges through the variable resistor 90 at a rate determined by the variable resistance. Comparing transistor 94 is responsive to the decreasing voltage of capacitor 92 during discharge. The transistor 94 conducts once each cycle when the capacitor voltage (which is applied to the base thereof) approaches the value of the reference potential 32 (which is applied to the emitter thereof). When the comparing transistor 94 conducts, it develops a voltage across resistor 96 (which is connected to the collector thereof). The developed voltage is applied to the base of a trigger transistor 98 and turns the transistor 98 on. The trigger transistor 98 is serially connected with primary 72 of a pulse transformer 74 and to a DC supply 100. Once during each cycle of the pulsating DC 14, the trigger transistor conducts and a trigger pulse flows through the primary 72. The transformer 74 has six secondaries 76, one connected to each one of the input switching thyristors 62. The trigger pulses through the transformer 74 switching the input switching thyristors of bridge 10 two at a time in the conventional fashion.

The output switching means or inverter 20 inverts the pulsating DC 14 from the bridge 10 after it has been filtered into constant DC by the inductors 16. The inverter provides an output square wave current 22 in the load 24. The diagonally positioned inverter output switching thyristors 20a conduct for the first half cycle of the square wave conducting the constant current through the load 24 in one direction. During the other half cycle, the other two output switching thyristors 20b conduct current through the load 24 in the opposite direction. The output switching thyristors 20a and 20b are triggered through conductors 27a and 27b, respectively, by oppositely phased square waves provided by the variable frequency multivibrator or oscillator 26. To switch properly the output switching thyristors require the energy stored during each half cycle in the ballast capacitors 18 in the load 24. These capacitors charge each half cycle and discharge to supply the necessary reverse bias to turn off the conducting pair of output thyristors 20. The greater the current through the output thyristors 20, the more energy is required to stop the current therethrough and switch the thyristor 20 off.

The feedback circuit 40 is responsive to the sawtooth voltage waveform 28 across the load 24 by means of a feedback transformer 100 which has a primary 102 connected in parallel across the load 24 and a secondary 104 connected across a rectifying bridge 106 in the feedback circuit 40. The output of the feedback bridge 106 is applied across a voltage dividing network which includes a fixed resistor 108 serially connected to a variable resistor 110, and a capacitor 112 connected in parallel across the variable resistor 110. The rectified current from the feedback bridge charges the capaictor 112 which discharges through the variable resistor 110 at a controlled rate. Each half cycle the square wave curent 22 recharges the discharging capacitor so that the capacitor always has at least minimum voltage during normal operation. The capacitor voltage is applied to the base of feedback transistor 114 through base resistor 116. The feedback transistor 114 is normally Off due to the voltage across capacitor 112. If the load current increases above the critical value because of a short circuit across the load, the sawtooth type voltage waveform 28 is lost because the inverter 20 fails to switch. The capacitor 112 voltage then decreases because of the discharge through the variable resistor 110. The feedback switching transistor 114 turns On and conduits because the decreasing capacitor voltage can no longer maintain the transistor 114 in the Off state. The emitter of the feedback transistor 114 is connected to the base of an inversion transistor 118 which in turn is connected to the base of the trigger transistor 98. The inversion transistor 118 causes the trigger transistor 98 to turn Off preventing the trigger pulses from reaching the input switching thyristors. The input thyristors turn Off and interrupt the input current to the power supply circuit.

A resetting pulser 120 is provided which provides negative pulses to the base of one of the transistors, preferably the invention transistor 118. The pulsing frequency is preferably about one pulse per second. A manual pulsing switch may be employed. The pulses momentarily turn Off the inversion transistor 118 and pulse the trigger transistor 98. As a result, the bridge 10 is pulsed one time which is normally sufficient to restart the power supply. If the short circuit has not been removed, the power supply will not restart because the inverter thyristors 20a and 20b will fail to switch as before.

The load 24 as seen in detail in FIG. 1 has a plurality of individually switched banks or units each of which includes a plurality of gaseous discharge devices or fluorescent lamps 44. Each fluorescent lamp 44 has a serially connected ballast capacitor 18 which ballasts the lamps 44 during operation and supply switching energy to the output switching thyristors 20. Any number of banks of lamps 44 may be switched into the load 24, by closing the switches 45 serially connected with the banks. As more banks are switched in, more energy is thus available to switch the output thyristors 20 because of the added ballast reactance. As mentioned previously the output thyristors 20 require more switching energy as the current therethrough increases. The load 24 has a critical load impedance which depends on how many lamps 44 are switched in. If the load impedance drops below the critical value, the capacitor energy is inoperable to switch the load current. The capacitor energy is unable to hold the previously conducting thyristors 20 reversed biased long enough for them to regain their non-conducting state. If a screw driver were inadvertently placed across the power supply output conductors 23, a short circuit or low resistance would be introduced in parallel with the load 24. This would increase the current drawn from the supply without a corresponding increase in the storing capacity of the reactive portion of the load. The output thyristors 20 will not switch and the sawtooth voltage 28 will be lost. This difficulty is not encountered when the number of banks in the load 24 is changed because the reactive portion of the load remains constant relative to the resistive portion, and the load impedance has a value equal to or greater than the critical value.

The total reaction time of the feedback circuit is the sum of the time required for the capacitor 112 to discharge enough to allow the feedback switching transistor 114 to turn On, plus the negligible reaction time of the feedback switching transistor 114 and the phase reversing transistor 118, plus no more than one sixth of one cycle of one phase of the three phase input AC 12. One sixth of a cycle is the time between trigger pulses to the bridge 10. The discharge time can be minimized by adjusting the variable discharge resistor 110. The reaction time of the two transistors is negligible, approximately 1 microsecond. Therefore, for all practical purposes, the reaction time of the short circuit protection system is always less than one sixth of one sixtieth of a second or .00277 second. For a single phase bridge 10 the reaction time would be one half of a cycle period or .0167 second.

In order to teach a specific embodiment of this invention, the following list identifies the circuit components and the various applied voltages required for proper operation in order of their reference numerals:

| | | |
|---|---|---:|
| Inductor 16 | millihenrys | 16 |
| Ballast capacitor 18 | microfarad | .068 |
| Output switching thyristor 20 | | W809S |
| Lamp 44 (fluorescent) | watts | 40 |
| Input switching thyristors | | W809S |
| Transformer 74 | | 20:7:7:7:7:7:7 |
| Fixed resistor 89 | ohms | 56,000 |
| Variable resistor 90 | do | 0–50,000 |
| Capacitor 92 | microfarad | .047 |
| Comparing transistor 94 (Motorola) | | 2N3115 |
| Collector resistor 96 | ohms | 3,300 |
| Trigger transistor 98 (Westinghouse) | | 153–05–W |
| Base resistor 99 | ohms | 1,000 |
| Feedback transformer 100 | | Stepdown 20:1 |
| Feedback bridge 106 | | 1N645 G.I. |
| Fixed resistor 108 | ohms | 100 |
| Variable resistor 110 | do | 12,000 |
| Capacitor 112 | microfarad | .47 |
| Feedback transistor 114 (Motorola) | | 2N3115 |
| Base resistor 116 | ohms | 100 |
| Reversing transistor 118 (Motorola) | | 2N1711 |
| Base resistor 119 | ohms | 1,000 |
| Three phase input 54 | volts AC, 208 c.p.s | 60 |
| Reference potential 32 | volts DC | 14 |

These proposed values are for illustrative purposes only and may vary for other applications of this invention.

This invention has two modes of operation. The first mode has been discussed previously and the periodic feedback component is removed completely by failure of the output switching thyristors 20 to switch. In the second mode, this switching failure does not occur. The periodic feedback component need only be diminished enough to allow the feedback capacitor 112 to discharge sufficiently to turn on the feedback transistor 114. The mode of operation depends on how sensitive the feedback circuit is to decreases in the periodic output current. Either mode may be affected by adjusting the variable resistor 110. In the first mode, this resistor was decreased to shorten the reaction time of the protection system. The second mode is established by decreasing the resistor 110 to the point where the system is responding to low load resistances which are not serious enough to affect the inverter switching. In the second mode, as the resistive portion of the load 24 is decreased due to a short circuit, the voltage of the square wave current 22 decreases and the capacitor 112 cannot remain charged sufficiently to keep the feedback transistor 114 turned off. The second mode responds slower than the first mode and the second mode does not provide automatically increasing protection as the load is increased.

It will be recognized by those skilled in the art that the objects of the invention have been achieved by providing a circuit protection system that is almost instantaneously responsive to the short circuit conditions. The system detects the absence of a periodic waveform rather than the presence of excessive current and responds thereto simply by failing to turn on the input switching thyristor rather than by deactivating a switching device. The critical current of the system increases as the load is increased because the load reactance to load current ratio remains constant. The prior art devices responded to a fixed critical current which had to be greater than the heaviest current drawn by a variable load applied thereto. In the present invention the short circuit current is always only slightly greater than the current drawn by the variable load.

Although this invention has been described with respect to a particular embodiment thereof, it is not to be so limited as changes and modifications may be made therein which are within the intended scope of the invention.

I claim as my invention:

1. A power supply circuit adapted to be connected to an input current source for energizing a load device with a periodic output current, said circuit providing protection against excessive load current and comprising in combination:

current switching means connected in series between the current source and the load for controlling the input current therethrough, said current switching means having a low impedance state which is operable to conduct current therethrough to the load and a high impedance state which is operable to prevent current flow therethrough to the load, said current switching means being periodically switched to provide the periodic output current to the load;

trigger means for periodically switching said current switching means;

impedance means for developing a periodic voltage from the periodic output current; and a feedback circuit connected to said trigger means and having switching states responsive to the voltage developed by said impedance means for controlling said trigger means, so that whenever the load draws excessive current from said power supply circuit causing the voltage developed by the periodic output current to change, said feedback circuit responds thereto by switching states and causing said trigger means to establish a high impedance state in said current switching means which stops the input current flow from the energy source whereby said power supply circuit is protected against excessive load currents, said feedback circuit comprising, coupling means for coupling said feedback circuit to the periodic voltage developed across said impedance means, rectifier means connected to said coupling means for rectifying into DC the periodic output of said coupling means, capacitor means connected to said rectifier means for storing the charge provided by said rectifier means, additional impedance means connected in parallel relation to said capacitor means for allowing the stored DC to discharge at a predetermined rate, and feedback switching means responsive to the voltage across said capacitor means for causing said trigger means to establish an impedance state of said current switching means which interrupts the flow of input current.

2. A power supply circuit adapted to be connected to an input current source for energizing a load device with a periodic output current, said circuit providing protection against excessive load current and comprising in combination:

current switching means connected in series between the current source and the load for controlling the input current therethrough, said current switching means having a low impedance state which is operable to conduct current therethrough to the load and a high impedance state which is operable to prevent current flow therethrough to the load, said current switching means being periodically switched to provide the periodic output current to the load;

trigger means for periodically switching said current switching means;

impedance means for developing a periodic voltage from the periodic output current; and a feedback circuit connected to said trigger means and having switching states responsive to the voltage developed by said impedance means for controlling said trigger means, so that whenever the load draws exsive current from said power supply circuit causing the voltage developed by the periodic output current to change, said feedback circuit responds thereto by switching states and causing said trigger means to establish a high impedance state in said current switching means which stops the input current flow from the energy source whereby said power supply circuit is protected against excessive load currents, said feedback circuit comprising, a transformer having a primary winding responsive to the periodic output voltage developed across said impedance means, and having a secondary winding connected to said feedback circuit, at least one diode connected to the secondary winding of said transformer for rectifying into DC the periodic current produced therein by the periodic output current, at least one capacitor for storing the charge provided by the DC, an additional impedance means connected in parallel relation to said capacitor for allowing the stored DC to discharge at a predetermined rate, and feedback switching means responsive to the voltage across said capacitor for causing said trigger means to establish an impedance state of said current switching means which interrupts the flow of input current.

References Cited

UNITED STATES PATENTS

| | | | |
|---|---|---|---|
| 3,243,689 | 3/1966 | Perrins | 317—33 X |
| 3,329,870 | 7/1967 | De Viney et al. | 317—33 X |

MILTON O. HIRSHFIELD, *Primary Examiner.*

R. V. LUPO, *Assistant Examiner.*